United States Patent
Tomizuka et al.

(10) Patent No.: US 10,816,748 B2
(45) Date of Patent: Oct. 27, 2020

(54) DISPLAY APPARATUS HAVING HOLDING MEMBER BETWEEN OPTICAL SHEET AND DIFFUSION PLATE

(71) Applicant: Sakai Display Products Corporation, Osaka (JP)

(72) Inventors: Harumasa Tomizuka, Osaka (JP); Motoaki Okitsu, Osaka (JP)

(73) Assignee: Sakai Display Products Corporation, Osaka (JP)

( * ) Notice: Subject to any disclaimer, the term of this patent is extended or adjusted under 35 U.S.C. 154(b) by 322 days.

(21) Appl. No.: 15/857,088

(22) Filed: Dec. 28, 2017

(65) Prior Publication Data

US 2018/0143394 A1 May 24, 2018

Related U.S. Application Data

(63) Continuation-in-part of application No. PCT/JP2015/068671, filed on Jun. 29, 2015.

(51) Int. Cl.
*G02B 5/02* (2006.01)
*G02B 7/00* (2006.01)
*G02F 1/1333* (2006.01)
*G02F 1/1335* (2006.01)
*G09F 9/00* (2006.01)
(Continued)

(52) U.S. Cl.
CPC .............. *G02B 7/00* (2013.01); *G02B 5/02* (2013.01); *G02B 5/0273* (2013.01); *G02F 1/133308* (2013.01); *G09F 9/00* (2013.01); *G02F 1/133608* (2013.01); *G02F 2001/133317* (2013.01); *H04N 5/64* (2013.01)

(58) Field of Classification Search
CPC .......... G02B 5/02–0294; G02B 6/0025; G02B 6/0051; G02B 7/00; G02B 7/008; G02F 1/133308; G02F 2001/133314–133328; G02F 1/133606; G02F 1/133608
USPC ............................ 349/64; 359/512, 599, 615
See application file for complete search history.

(56) References Cited

U.S. PATENT DOCUMENTS 7,275,852 B2  10/2007  Kim et al.
2001/0006461 A1  7/2001  Okuno
(Continued)

FOREIGN PATENT DOCUMENTS

CN  104246352 A  12/2014
JP  2001249622 A  9/2001
(Continued)

OTHER PUBLICATIONS

English Translation of the International Search Report, PCT International Application No. PCT/JP2015/068671, Japan Patent Office, Tokyo, Japan. dated Sep. 8, 2015.

*Primary Examiner* — Ryan S Dunning
(74) *Attorney, Agent, or Firm* — Snell & Wilmer L.L.P.

(57) ABSTRACT

There is provided a display apparatus including a holding member disposed between a peripheral part of an optical sheet and a peripheral part of a diffusion plate. The holding member has a first end portion contacting the peripheral part of a rear surface of the optical sheet and a second end portion contacting the peripheral part of the first surface of the diffusion plate. The holding member has a first holding projection for holding the diffusion plate. The first holding projection protrudes from the second end portion along the first surface of the diffusion plate.

12 Claims, 8 Drawing Sheets

(51) Int. Cl.
*H04N 5/64* (2006.01)
*G02F 1/13357* (2006.01)

(56) References Cited

U.S. PATENT DOCUMENTS

| | | |
|---|---|---|
| 2004/0207996 A1 | 10/2004 | Kao |
| 2006/0104080 A1* | 5/2006 | Kim .................. G02F 1/133608 362/555 |
| 2007/0195223 A1 | 8/2007 | Nishiyama et al. |
| 2010/0014025 A1 | 1/2010 | Teragawa |
| 2010/0296008 A1 | 11/2010 | Kuromizu et al. |
| 2015/0078032 A1 | 3/2015 | Horiguchi et al. |
| 2015/0234116 A1 | 8/2015 | Azuma et al. |
| 2016/0011461 A1* | 1/2016 | Kim .................. G02F 1/133608 349/64 |

FOREIGN PATENT DOCUMENTS

| | | |
|---|---|---|
| JP | 2007225781 A | 9/2007 |
| JP | 2010123398 A | 6/2010 |
| WO | 2008084569 A1 | 7/2008 |
| WO | 2009090786 A1 | 7/2009 |
| WO | 2014199987 A1 | 12/2014 |

* cited by examiner

DISPLAY APPARATUS HAVING HOLDING MEMBER BETWEEN OPTICAL SHEET AND DIFFUSION PLATE

CROSS-REFERENCE TO RELATED APPLICATION

This is a continuation-in-part of PCT international application No. PCT/JP2015/068671 filed on Jun. 29, 2015, incorporated herein by reference.

BACKGROUND OF THE INVENTION

The present disclosure relates to a display apparatus comprising a diffusion plate, an optical sheet and a holding member for holding the optical sheet and the diffusion plate.

Recently so-called flat-screen display apparatuses have spread, and in the flat-screen display apparatuses, a variety of features has been made to realize a narrow frame reducing a width of a frame outside a display screen.

For example, U.S. Pat. No. 7,275,852 B discloses a flat-screen display apparatus comprising an assembly including an optical sheet and a diffusion plate in order to improve assembling efficiency.

Meanwhile, for the narrow frame of the above-mentioned flat-screen display apparatuses, due to generation of heat from a light source during operation or upsizing of a diffusion plate resulting from upsizing of the display apparatus, it has been difficult to prevent coming off of the diffusion plate due to low-temperature shrinkage of the diffusion plate and secure a gap for absorbing warpage of the diffusion plate caused by high-temperature expansion of the diffusion plate. However, in the display apparatus described in U.S. Pat. No. 7,275,852 B, no measures were considered on such problems.

SUMMARY OF THE INVENTION

The present invention has been made in view of such circumstances as mentioned above, and an object of the present invention is to provide a display apparatus comprising a diffusion plate having a first surface and a second surface opposite to the first surface, an optical sheet facing the first surface of the diffusion plate and disposed apart from the first surface of the diffusion plate, and a holding member for holding the optical sheet and the diffusion plate, wherein the holding member is disposed between a peripheral part of the optical sheet and a peripheral part of the first surface of the diffusion plate, and coming off of the diffusion plate from the holding member due to low-temperature contraction of the diffusion plate can be prevented and warping due to high-temperature expansion of the diffusion plate can be suppressed, and as a result, positional deviation of the diffusion plate due to such warping can be prevented beforehand.

A display apparatus according to one embodiment of the present invention comprises a diffusion plate having a first surface and a second surface opposite to the first surface, an optical sheet facing the first surface of the diffusion plate and disposed apart from the first surface of the diffusion plate, and a holding member for holding the optical sheet and the diffusion plate, wherein the holding member is disposed between a peripheral part of the optical sheet and a peripheral part of the first surface of the diffusion plate, wherein the holding member comprises a first end portion contacting the peripheral part of a rear surface of the optical sheet, the rear surface of the optical sheet facing the first surface of the diffusion plate, and a second end portion contacting the peripheral part of the first surface of the diffusion plate, and a first holding projection contacting the peripheral part of the first surface of the diffusion plate, the first holding projection protruding from the second end portion along the first surface of the diffusion plate.

According to the embodiment, the holding member comprises a first end portion contacting the peripheral part of a rear surface of the optical sheet, the rear surface of the optical sheet facing the first surface of the diffusion plate and a second end portion contacting the peripheral part of the first surface of the diffusion plate, and a first holding projection contacting the peripheral part of the first surface of the diffusion plate, the first holding projection protruding from the second end portion along the first surface of the diffusion plate. Therefore, coming off of the diffusion plate from the holding member due to low-temperature contraction of the diffusion plate is prevented and warping of the diffusion plate due to high-temperature expansion of the diffusion plate can be suppressed, and as a result, it is possible to attain narrower frame of the display apparatus.

In another embodiment of the display apparatus according to the present invention, the display apparatus further comprises a holding frame for holding the diffusion plate, wherein the holding frame has an end part contacting the second surface of the diffusion plate at the peripheral part of the diffusion plate, and the holding frame has a second holding projection contacting the peripheral part of the second surface of the diffusion plate, the second holding projection protruding from the end part of the holding frame along the second surface of the diffusion plate.

According to the embodiment, the holding frame has a second holding projection contacting the peripheral part of the second surface of the diffusion plate and the second holding projection protrudes from the end part of the holding frame along the second surface of the diffusion plate. Therefore, coming off of the diffusion plate from the holding member due to low-temperature contraction of the diffusion plate is prevented and warping of the diffusion plate due to high-temperature expansion of the diffusion plate can be suppressed, and as a result, it is possible to attain narrower frame of the display apparatus.

In yet another embodiment, position of the first holding projection overlaps that of the second holding projection in a plan view towards a main surface of the diffusion plate.

According to the embodiment, position of the first holding projection overlaps that of the second holding projection in a plan view towards a main surface (i.e., the first surface or the second surface) of the diffusion plate. Therefore, coming off of the diffusion plate from the holding member due to low-temperature contraction of the diffusion plate is prevented and warping of the diffusion plate due to high-temperature expansion of the diffusion plate can be suppressed, and the diffusion plate is sandwiched between the first holding projection and the second holding projection.

In yet another embodiment, position of the first holding projection is shifted from that of the second holding projection in a plan view towards a main surface of the diffusion plate along an edge of the diffusion plate.

According to the embodiment, position of the first holding projection is shifted from that of the second holding projection in a plan view towards a main surface (i.e., the first surface or the second surface) of the diffusion plate along an edge of the diffusion plate. Therefore, coming off of the diffusion plate from the holding member due to low-temperature contraction of the diffusion plate is prevented and warping of the diffusion plate due to high-temperature expansion of the diffusion plate can be suppressed, and the diffusion plate is sandwiched between the first holding projection and the second holding projection.

In yet another embodiment, the diffusion plate is formed in a rectangular shape, and the first holding projection and the second holding projection are formed in a fin shape, each of these projections having a thickness in a direction extending along an edge of the diffusion plate.

According to the embodiment, the first holding projection and the second holding projection are formed in a fin shape, each of these projections having a thickness in a direction extending along an edge of the diffusion plate. Therefore, it is possible to prevent the first holding projection and the second holding projection from interfering advancing of light.

A display apparatus according to yet another embodiment of the present invention comprises a diffusion plate having a first surface and a second surface opposite to the first surface, an optical sheet facing the first surface of the diffusion plate and disposed apart from the first surface of the diffusion plate, a holding member for holding the optical sheet and the diffusion plate, wherein the holding member is disposed between a peripheral part of the optical sheet and a peripheral part of the first surface of the diffusion plate, and a holding frame for holding the diffusion plate, the holding frame having an end part contacting the second surface of the diffusion plate at the peripheral part of the diffusion plate, wherein the holding frame has a second holding projection contacting the peripheral part of the second surface of the diffusion plate, the second holding projection protruding from the end part of the holding frame along the second surface of the diffusion plate.

In yet another embodiment, the diffusion plate is formed in a rectangular shape, and the second holding projection is formed in a fin shape, the second holding projection having a thickness in a direction extending along an edge of the diffusion plate.

According to the embodiment of the present invention, coming off of the diffusion plate from the holding member due to low-temperature contraction of the diffusion plate can be prevented and warping of the diffusion plate due to high-temperature expansion of the diffusion plate can be suppressed, and as a result, positional deviation of the diffusion plate due to such warping can be prevented beforehand.

DETAILED DESCRIPTION

The invention will be further described below in terms of several embodiments for display apparatuses of the present invention and particularly in terms of drawings showing television receivers each comprising a so-called liquid crystal panel.

Embodiment 1

Figure 1:
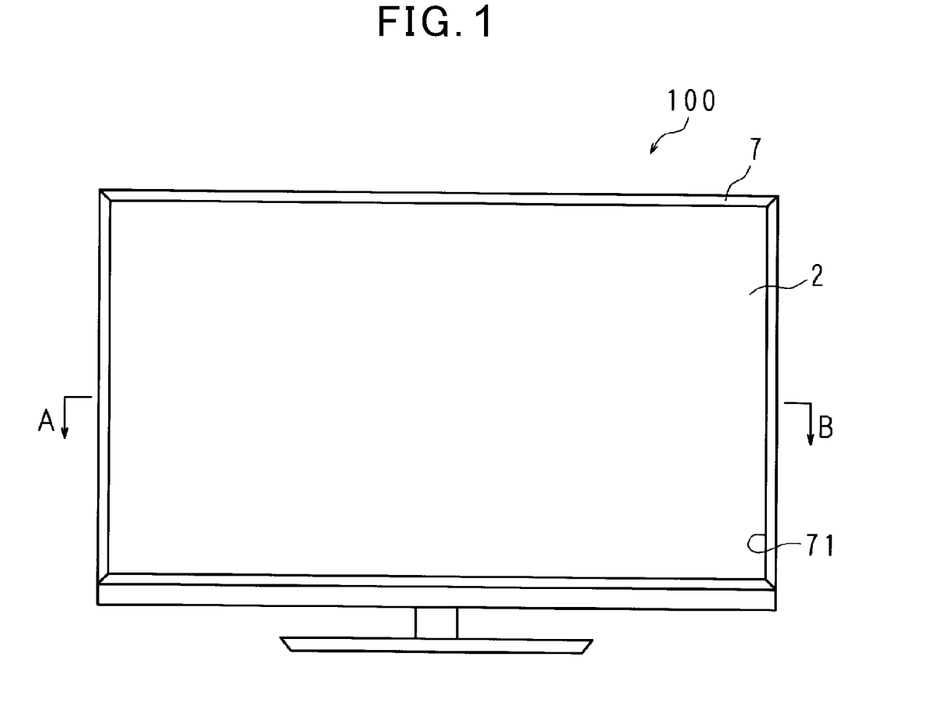
FIG. 1 shows a front view of an external appearance of a television receiver according to Embodiment 1.

FIG. 1 is a front view showing an external appearance of a television receiver according to Embodiment 1 of the present invention. In FIG. 1, a reference number 100 represents the television receiver according to the embodiment. The television receiver 100 according to the embodiment is, for example, a 70 inch television receiver. Hereinafter, for the purpose of illustration, the right and left direction of the television receiver 100 in FIG. 1 is referred to as a lateral direction, and a vertical direction in FIG. 1 is referred to as a longitudinal direction. A front (front surface of a liquid crystal display panel 2 described below) and rear direction of the television receiver 100 is referred to as a thickness direction.

Figure 2:
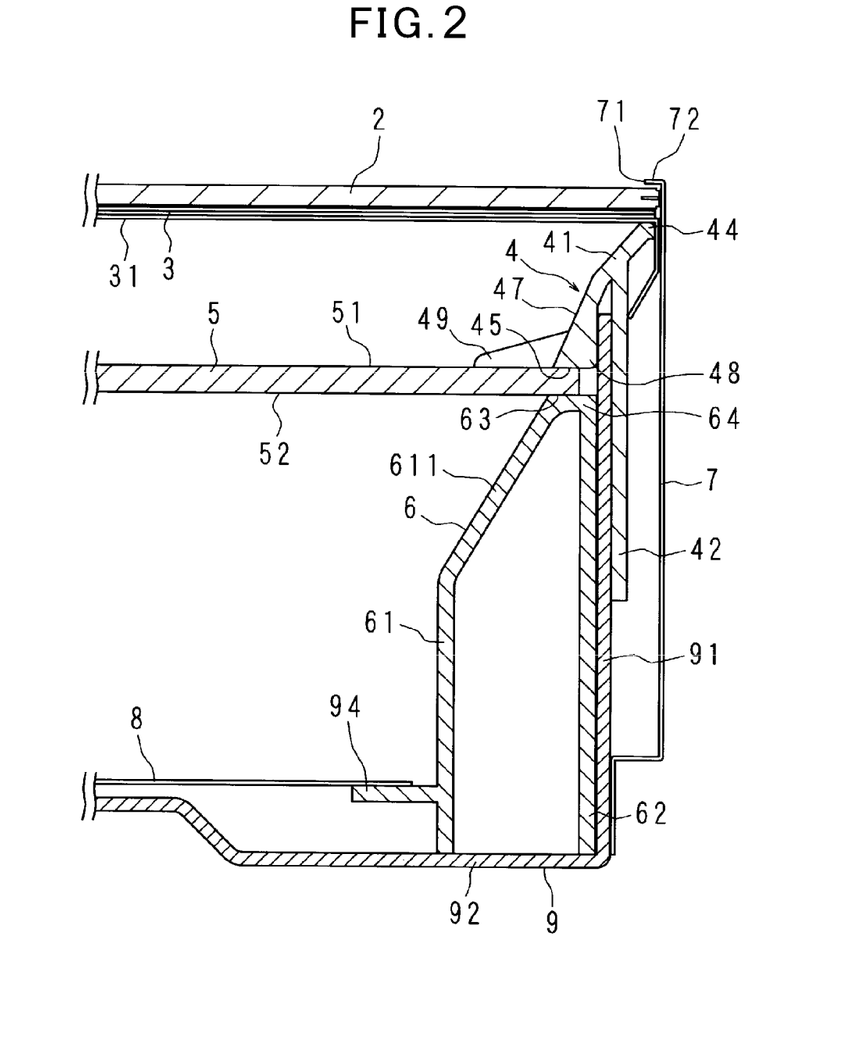
FIG. 2 shows a cross-sectional view along a line A-B of FIG. 1.

FIG. 2 shows a cross-sectional view along a line A-B of FIG. 1. FIG. 2 shows a structure of the television receiver 100 according to the embodiment. The television receiver 100 according to the embodiment is provided with a rectangular liquid crystal display panel 2 displaying an image as shown in FIG. 1. The liquid crystal display panel 2 has a display surface displaying an image and a light-entering surface opposite to the display surface. The television receiver 100 is provided with an optical sheet 3, a diffusion plate 5 and a reflection sheet 8 rearward of the liquid crystal display panel 2, in this order.

The diffusion plate 5 and the reflection sheet 8 are accommodated in a back light chassis 9 formed in a box shape. The peripheral part of the optical sheet 3 and side walls of the back light chassis 9 are wholly surrounded by bezel 7 formed in a rectangular frame shape having an opening to expose the display surface of the liquid crystal display panel 2. The bezel 7 may be an assembled type in which a plurality of components are assembled to form the bezel 7 or may be an integrated type. Hereinafter, for the purpose of illustration, explanation will be made, taking, as an example, a case of the bezel being an integrated type.

The optical sheet 3 has a front surface facing a light-entering surface of the liquid crystal display panel 2 and a rear surface 31 opposite to the front surface. The diffusion plate 5 has a first surface 51 facing the rear surface 31 of the optical sheet 3 and a second surface 52 opposite to the first surface 51. The diffusion plate 5 is disposed so that the first surface 51 of the diffusion plate 5 faces a rear surface 31 of the optical sheet 3. The optical sheet 3 is disposed apart from the first surface 51 of the diffusion plate 5. The reflection sheet 8 is disposed so that reflective surface of the reflection sheet 8 faces the second surface 52 of the diffusion plate 5.

At a peripheral part of the front of the liquid crystal display panel 2, front end part of the bezel 7 is located in a thickness direction of the television receiver 100. The bezel 7 is formed in a rectangular frame shape and has a rectangular display window 71 opening in front of the display surface of the liquid crystal display panel 2. An image displayed on the display surface of the liquid crystal display panel 2 is visible by a user through the display window 71.

The front end part of the bezel 7 is overlapped with the peripheral part of the display surface of the liquid crystal display panel 2 by a predetermined width. Hereinafter, the front end part is referred to as frame part 72. The peripheral part of the display surface of the liquid crystal display panel 2 is covered with the frame part 72.

The liquid crystal display panel 2 has a polarizing sheet (not shown) on the light-entering surface of the liquid crystal display panel 2. The polarizing sheet separates light entered into the polarizing sheet into P wave (horizontal polarized light component) and S wave (vertical polarized light component), and only P wave goes out toward the display surface of the liquid crystal display panel 2 and S wave is absorbed in the polarizing sheet. The liquid crystal display panel 2 may be, for example, an electrophoretic liquid crystal panel.

The optical sheet 3 facing the light-entering surface of the liquid crystal display panel 2 is a known optical sheet. Light emitted from a light source described below and entered into the optical sheet 3 through the diffusion plate 5 is diffused and condensed by the optical sheet 3, and then, more uniform light is emitted from the optical sheet 3 toward the liquid crystal display panel 2. For example, the optical sheet 3 comprises laminated three unit sheets.

In particular, the optical sheet 3 comprises two diffusion sheets and a prism sheet, and the prism sheet is interposed between the two diffusion sheets. The diffusion sheets and the prism sheet are in a rectangular shape and have the same size.

A first diffusion sheet of the two diffusion sheets is facing the diffusion plate 5. The first diffusion sheet diffuses light entering from a light source through the diffusion plate 5 and emits the light into the prism sheet. The prism sheet condenses the light entered through the first diffusion sheet and emits the light toward a second diffusion sheet. The light passed through the prism sheet is entered into the second diffusion sheet vertically to the prism sheet.

The second diffusion sheet facing the liquid crystal display panel 2 further diffuses the light entered through the prism sheet and emits the light with more uniform luminance distribution toward the light-entering surface of the liquid crystal display panel 2.

In the vicinity of the peripheral part of the rear surface 31 of the optical sheet 3, a holding member 4 for holding the optical sheet 3 is provided. In particular, the holding member 4 is disposed between the peripheral part of the optical sheet 3 and the peripheral part of the diffusion plate 5. The holding member 4 has an inclined part 41 and a vertical plate 42. The inclined part 41 has an inclined surface 47 extending at an obtuse angle with respect to the first surface 51 of the diffusion plate 5. The vertical plate 42 protrudes from a rear surface of the inclined part 41 vertically to the optical sheet 3.

The holding member 4 comprises a first end portion 44 contacting the peripheral part of the rear surface 31 of the optical sheet 3, thereby allowing the optical sheet 3 to be held by the holding member 4. On the other hand, the holding member 4 comprises a second end portion 48 contacting the peripheral part of the first surface 51 of the diffusion plate 5. In this embodiment, a flat end surface 45 of the second end portion 48 of the holding member 4 contacts the peripheral part of the first surface 51 of the diffusion plate 5. Thus, a given interval is maintained between the optical sheet 3 and the diffusion plate 5. Further, the diffusion plate 5 is held by means of the holding member 4 and a holding frame 6 described below. A reflection film is formed on a front of the inclined part 41 including inclined surface 47. The reflection film reflects light emitted from the first surface 51 of the diffusion plate 5 toward the liquid crystal display panel 2.

Further, the holding member 4 comprises a first holding projection 49 for holding the diffusion plate 5. The first holding projection 49 contacts the peripheral part of the first surface 51 of the diffusion plate 5. The first holding projection 49 protrudes from the second end portion 48 along the first surface 51 of the diffusion plate 5. The first holding projection 49 is extended from the edge of the end surface 45 of the second end portion 48 and contacts the peripheral part of the first surface 51 of the diffusion plate 5 to hold the diffusion plate 5.

Further, the first holding projection 49 is formed in a fin shape, and the dimension of the first holding projection 49 along a thickness direction of the diffusion plate 5 becomes smaller as it approaches to a projecting end of the first holding projection 49. A thickness direction of the first holding projection 49 is a direction along the edge of the rectangular diffusion plate 5. The thickness of the first holding projection 49 may be thinner as it approaches to the projecting end, or may be constant. Since the first holding projection 49 is formed in a fin shape and has a thickness in a direction extending along an edge of the diffusion plate 5, the first holding projection 49 is not likely to block light advancing from the light source toward the optical sheet 3 through the diffusion plate 5. In other words, it is possible to reduce the range of a shadow caused by the first holding projection 49.

A specific space is formed between the second end portion 48 of the inclined part 41 and the vertical plate 42 in the region behind the inclined part 41, and this space is substantially the same as the thickness of a side wall 91 of the back light chassis 9 described below. Namely, by putting the side wall 91 of the back light chassis 9 into the space between the second end portion 48 and the vertical plate 42, the holding member 4 is held by the back light chassis 9.

The rectangular diffusion plate 5 is disposed facing the rear surface 31 of the optical sheet 3. Namely, the first surface 51 of the diffusion plate 5 is disposed facing the rear surface 31 of the optical sheet 3 and apart from the rear surface 31 of the optical sheet 3. The light emitted from the light source and entered through the second surface 52 of the diffusion plate 5 is diffused in the diffusion plate 5 and the light is emitted from the first surface 51 of the diffusion plate 5 toward the optical sheet 3.

The diffusion plate 5 is made of, for example, a milky white resin (acrylic resin, polycarbonate resin or the like) in which a dispersing agent is added. When a point light source such as LED is used, the diffusion plate 5 diffuses the light from each point source of light and emits the light through the diffusion plate 5 uniformly from the first surface 51 as surface emission.

A holding frame 6 for holding the diffusion plate 5 is provided in the vicinity of the peripheral part of the second surface 52 of the diffusion plate 5. The holding frame 6 has a tapered shape in a cross-sectional view, in which a width of the holding frame 6 is reduced toward a front end part 64 of the holding frame 6. The front end part 64 contacts the peripheral part of the second surface 52 of the diffusion plate 5. The holding frame 6 has an outer wall 62 vertical to the diffusion plate 5, and an inner wall 61 having an inclined part 611 inclined with respect to the diffusion plate 5 from the front end part 64 up to the middle part of the holding frame 6.

The holding frame 6 has a flat surface 63 at the front end part 64, and the peripheral part of the second surface 52 of the diffusion plate 5 contacts the flat surface 63. Thereby, the diffusion plate 5 is held by the holding frame 6.

The peripheral part of the diffusion plate 5 is sandwiched by the second end portion 48 of the holding member 4 and the front end part 64 of the holding frame 6.

The holding frame 6 is disposed on a bottom 92 of the back light chassis 9 formed in a box shape so that the outer wall 62 of the holding frame 6 contacts an inner surface of the side wall 91 of the back light chassis 9. The holding frame 6 has a sheet-holding protrusion 94 for holding the reflection sheet 8. The sheet-holding protrusion 94 protrudes from the inner wall 61 of the holding frame 6 and extended in a direction parallel with the second surface 52 of the diffusion plate 5. The sheet-holding protrusion 94 is formed in a rectangular shape and is provided at a rear end part of the holding frame 6 near the bottom 92 of the back light chassis 9. A reflection film is formed on an inner surface of the inner wall 61 in order to reflect light emitted from the light source toward the diffusion plate 5.

The reflection sheet 8 is, for example, in a rectangular shape, and is held on the sheet-holding protrusion 94 so that the reflective surface of the reflection sheet 8 faces the second surface 52 of the diffusion plate 5. In particular, the reflection sheet 8 is held so that the peripheral part on a rear surface of the reflection sheet 8 contacts the sheet-holding protrusion 94 and the reflective surface of the reflection sheet 8 faces the second surface 52 of the diffusion plate 5. Thus, a predetermined space is secured between the diffusion plate 5 and the reflection sheet 8.

Further, the light source (not shown) is provided on the reflective surface of the reflection sheet 8. Examples of the light source include a cold cathode fluorescent lamp (CCFL), an external electrode fluorescent lamp (EEFL), a hot cathode fluorescent lamp (HCFL), a light emitting diode (LED) and the like.

The bezel 7 is disposed so as to surround the peripheral part of the liquid crystal display panel 2, the peripheral part of the optical sheet 3, the first end portion 44 of the holding member 4 and the side wall 91 of the back light chassis 9.

Figure 3:
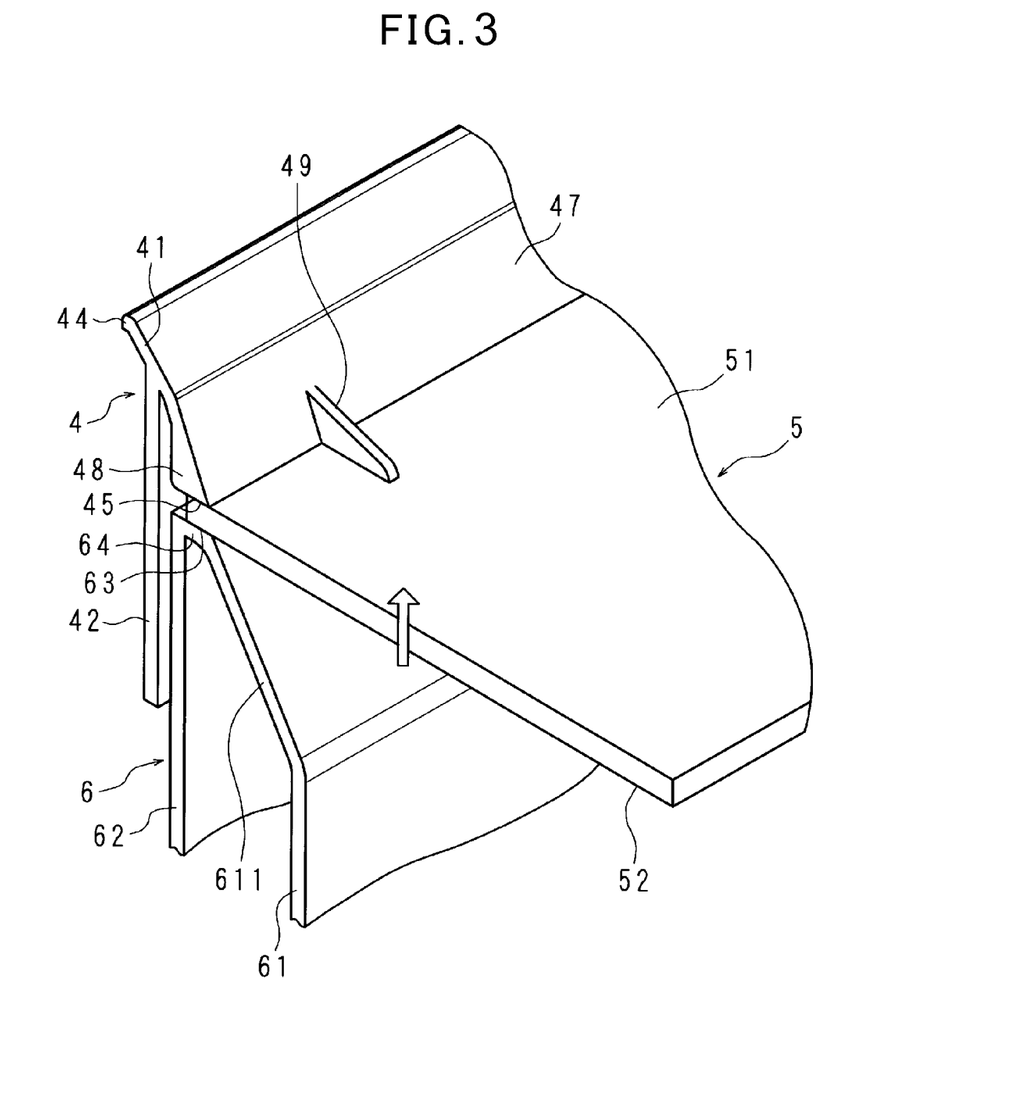
FIG. 3 shows an explanatory view showing a positional relationship of a holding member, a diffusion plate and a holding frame in the television receiver according to Embodiment 1.

FIG. 3 shows an explanatory view showing a positional relationship of the holding member 4, the diffusion plate 5 and the holding frame 6 in the television receiver 100 according to Embodiment 1.

As mentioned above, the first holding projection 49 protrudes locally from the inclined surface 47 at an edge of the second end portion 48 of the holding member 4. The first holding projection 49 protrudes along the diffusion plate 5 and contacts the peripheral part of the first surface 51 of the diffusion plate 5.

Therefore, in the television receiver 100 according to Embodiment 1, coming off of the diffusion plate 5 due to low-temperature contraction and warping of the diffusion plate 5 due to high-temperature expansion (a direction shown by an arrow in FIG. 3) can be prevented beforehand. Details will be explained below.

Warping of the diffusion plate 5 in the thickness direction of the diffusion plate 5 occurs due to heat generation of the light source during operation of the television receiver 100 or due to upsizing of the diffusion plate 5 resulting from upsizing of a television receiver 100.

However, as mentioned above, the television receiver 100 according to Embodiment 1 has the first holding projection 49 and the first holding projection 49 contacts the peripheral part of the first surface 51 of the diffusion plate 5 to hold the diffusion plate 5. Therefore, warping of the diffusion plate 5 in the direction shown by the arrow in FIG. 3 due to high-temperature expansion and coming off of the diffusion plate 5 due to low-temperature contraction when the television receiver 100 is not in operation are suppressed. Accordingly, occurrence of such warping and coming off of the diffusion plate 5 can be prevented beforehand.

The position of the first holding projection 49 may be changed as required, and the first holding projection 49 may be extended from a center part of the edge of the second end portion 48 in a longitudinal direction of the holding member 4 extending along an edge of the diffusion plate 5.

In the above-mentioned embodiments, there is exemplified a case of providing one first holding projection 49 at an edge of the second end portion 48 of the holding member 4. However, the present disclosure is not limited thereto, and two or more first holding projections may be provided. In the case of two or more of first holding projections 49, they can be disposed at an appropriate interval in the longitudinal direction of the holding member 4.

Embodiment 2

In the television receiver 100 according to Embodiment 1, an example of the holding member 4 provided with the first holding projection 49 is described. However, the present disclosure is not limited thereto.

Figure 4:
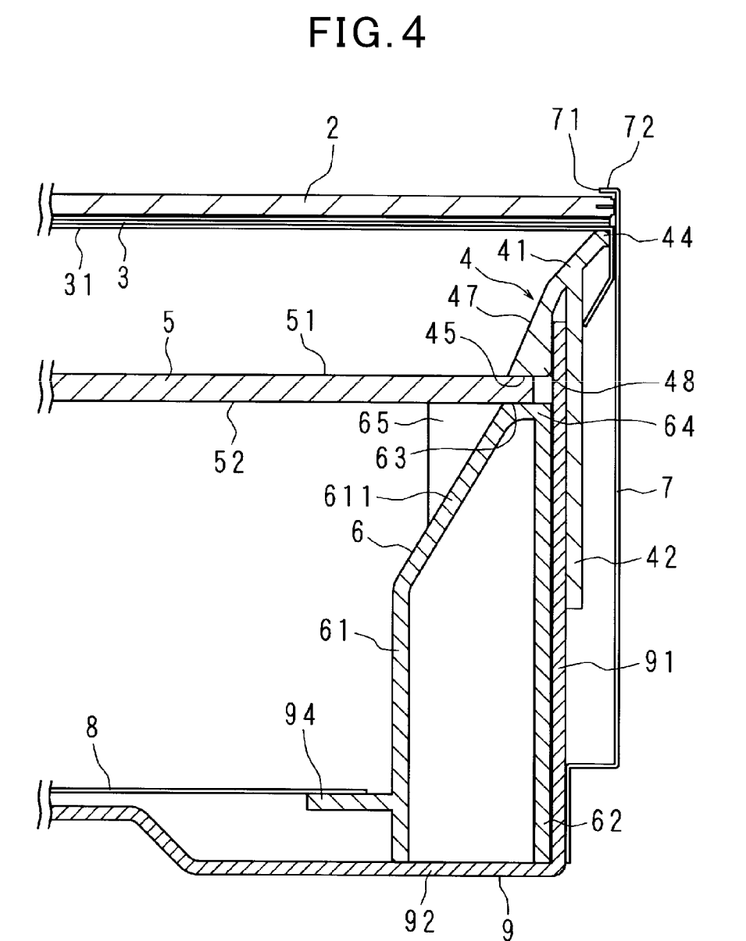
FIG. 4 shows a partial cross-sectional view showing a structure of a television receiver according to Embodiment 2.
Figure 5:
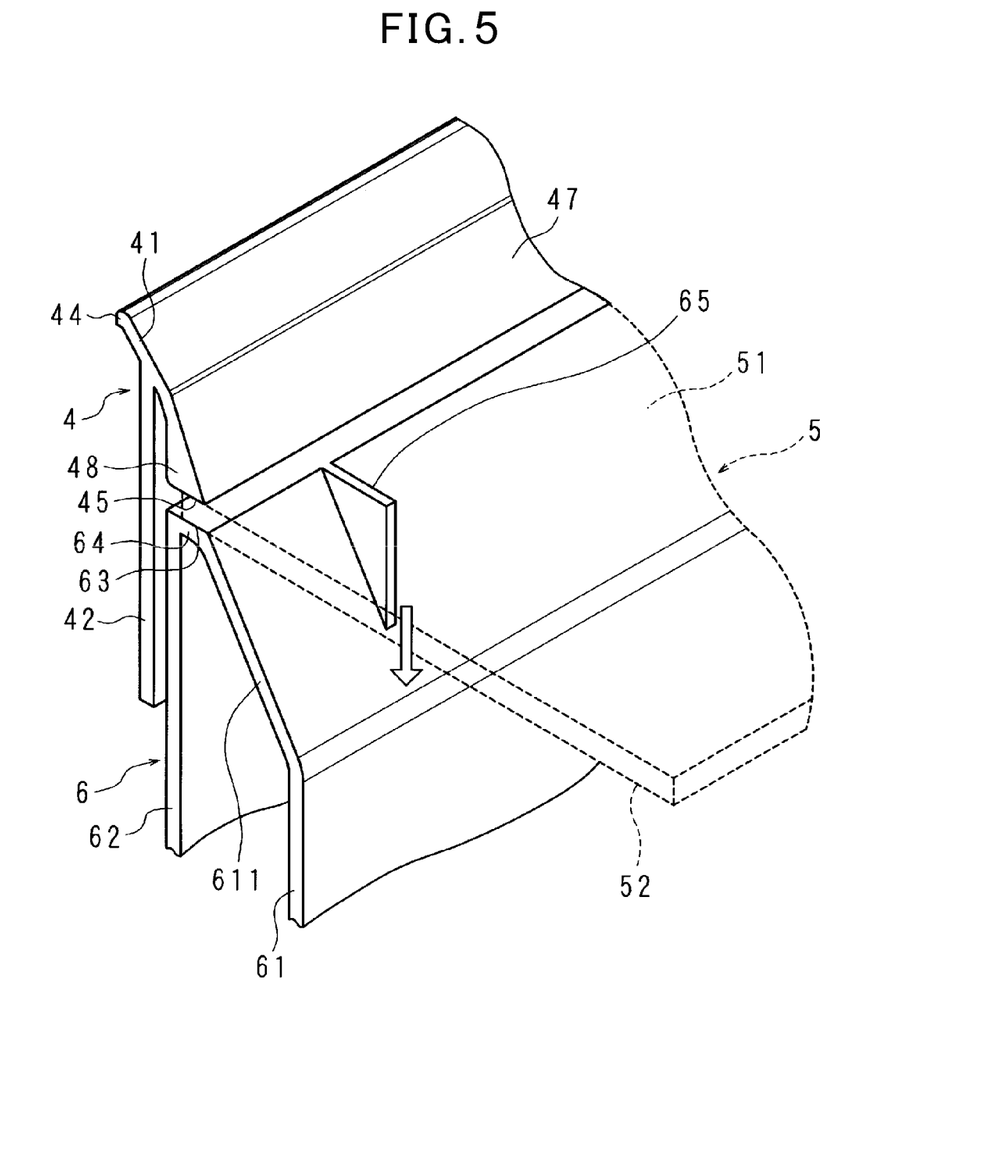
FIG. 5 shows an explanatory view showing a positional relationship of a holding member, a diffusion plate and a holding frame in the television receiver according to Embodiment 2.

FIG. 4 shows a partial cross-sectional view showing a structure of the television receiver 100 according to Embodiment 2, and FIG. 5 shows an explanatory view showing a positional relationship of the holding member 4, the diffusion plate 5 and a holding frame 6 in the television receiver 100 according to Embodiment 2. In FIG. 5, for the purpose of illustration, the diffusion plate 5 is shown by a dotted line.

In the television receiver 100 according to Embodiment 2, the holding frame 6 has a second holding projection 65, and the diffusion plate 5 is held by the second holding projection 65. Details will be explained below.

The second holding projection 65 protrudes from an inner surface of the inclined part 611 of the holding frame 6. The second holding projection 65 protrudes from the front end part 64 of the holding frame 6 along the second surface 52 of the diffusion plate 52. In other words, the second holding projection 65 is extended from the edge of the flat surface 63 of the front end part 64 and contacts the peripheral part of the second surface 52 of the diffusion plate 5 to hold the diffusion plate 5.

Further, the second holding projection 65 is formed in a fin shape, and the dimension of the second holding projection 65 along a thickness direction of the diffusion plate 5 becomes smaller as it approaches to a projecting end of the second holding projection 65. The thickness direction of the second holding projection 65 is a direction along the edge of the rectangular diffusion plate 5. The thickness of the second holding projection 65 may be thinner as it approaches to the projecting end, or may be constant. Since the second holding projection 65 is formed in a fin shape and has a thickness in a direction extending along an edge of the diffusion plate 5, the second holding projection 65 is not likely to block light advancing from the light source toward the optical sheet 3 through the diffusion plate 5. In other words, it is possible to reduce the range of a shadow caused by the second holding projection 65 as low as possible.

Therefore, in the television receiver 100 according to Embodiment 2, coming off of the diffusion plate 5 due to low-temperature contraction and warping of the diffusion plate 5 due to high-temperature expansion (a direction shown by an arrow in FIG. 5) can be prevented beforehand. Details will be explained below.

Warping of the diffusion plate 5 in the thickness direction of the diffusion plate 5 occurs due to heat generation during operation of the television receiver 100 or due to upsizing of the diffusion plate 5. As mentioned above, the television receiver 100 according to Embodiment 2 has the second holding projection 65, and the second holding projection 65 contacts the peripheral part of the second surface 52 of the diffusion plate 5 to hold the diffusion plate 5. Therefore, warping of the diffusion plate 5 in the direction shown by the arrow in FIG. 5 and coming off of the diffusion plate 5 due to low-temperature contraction when the television receiver 100 is not in operation are suppressed. Accordingly, occurrence of such warping and coming off of the diffusion plate 5 can be prevented beforehand.

The position of the second holding projection 65 may be changed as required, and the second holding projection 65 may be extended from a center part of the edge of the second end portion 48 in a longitudinal direction of the holding frame 6 extending along an edge of the diffusion plate 5.

In the above-mentioned embodiments, there is exemplified a case of providing one second holding projection 65 at an edge of the front end part 64 of the holding frame 6. However, the present disclosure is not limited thereto, and two or more second holding projections 65 may be provided. In the case of two or more of second holding projections 65, they can be disposed at an appropriate interval in the longitudinal direction of the holding frame 6.

For the same parts as in Embodiment 1, the same reference numbers are applied and detailed explanation therefor is omitted.

Embodiment 3

The television receiver 100 according to Embodiment 3 has a similar constitution to that of the television receiver 100 according to Embodiment 1, but the both are different from each other in the constitution of the holding member 4 and the holding frame 6.

Figure 6:
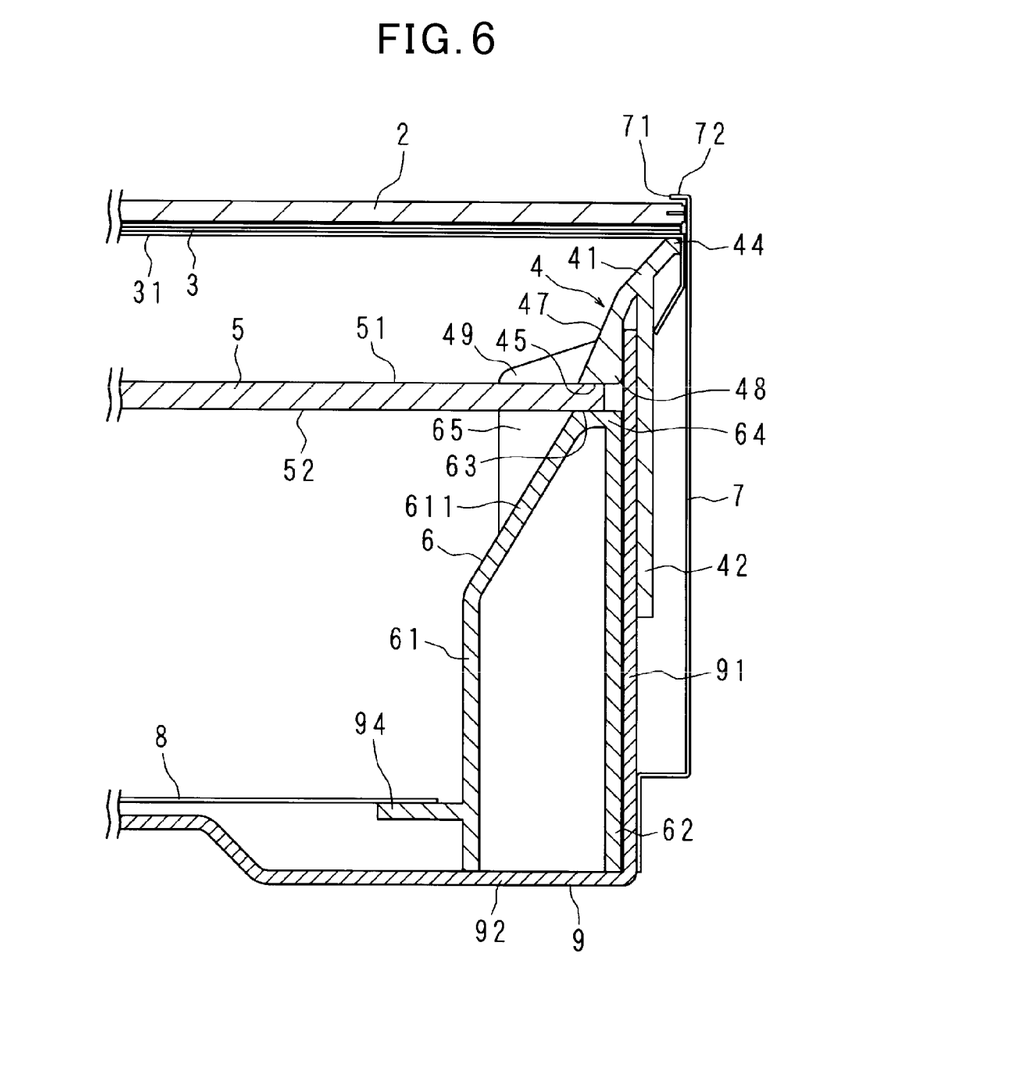
FIG. 6 shows a partial cross-sectional view showing a structure of a television receiver according to Embodiment 3.
Figure 7:
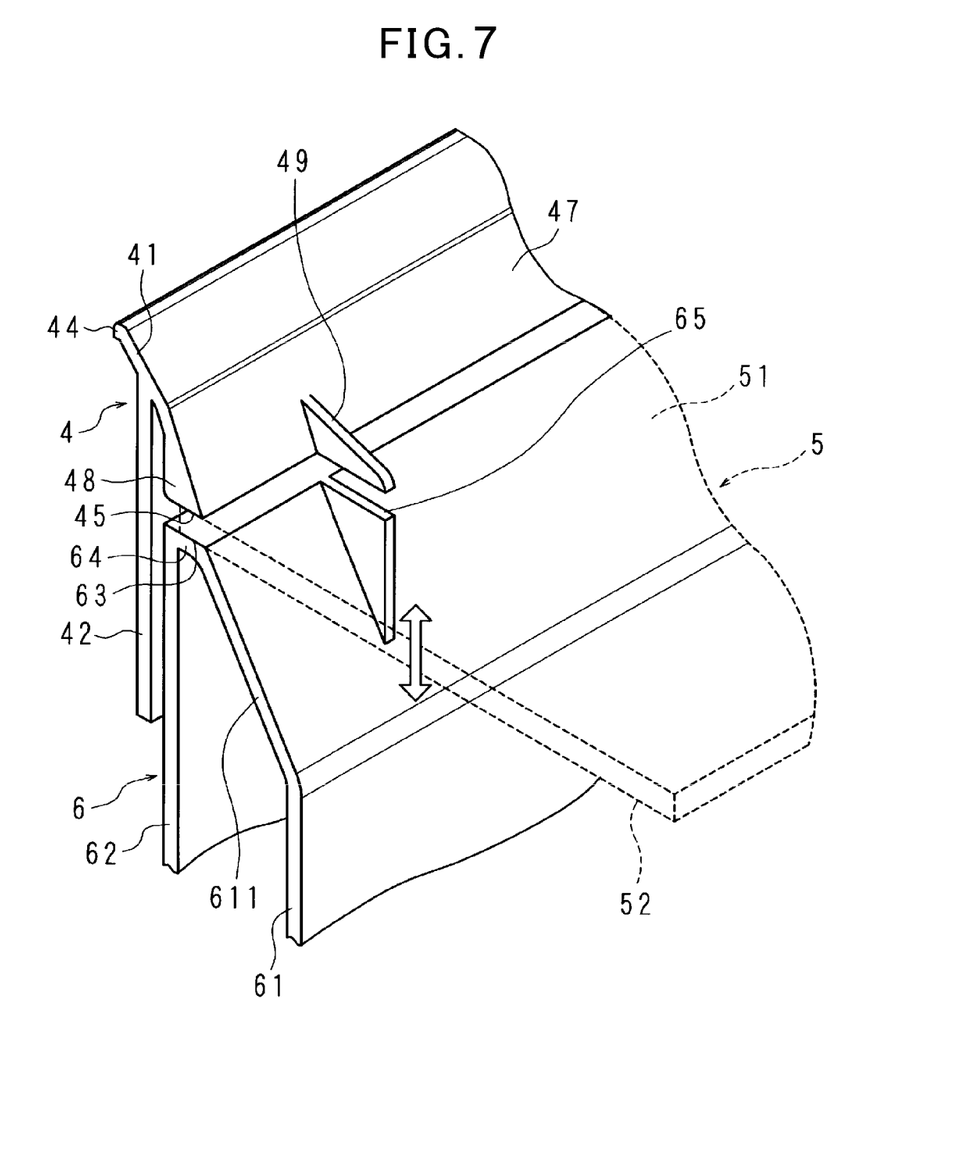
FIG. 7 shows an explanatory view showing a positional relationship of a holding member, a diffusion plate and a holding frame in the television receiver according to Embodiment 3.

FIG. 6 shows a partial cross-sectional view showing a structure of a television receiver 100 according to Embodiment 3, and FIG. 7 shows an explanatory view showing a positional relationship of the holding member 4, the diffusion plate 5 and the holding frame 6 in the television receiver 100 according to Embodiment 3. In FIG. 7, for the purpose of illustration, the diffusion plate 5 is shown by a dotted line.

In the television receiver 100 according to Embodiment 3, the first holding projection 49 protrudes locally from the inclined surface 47 at an edge of the second end portion 48 of the holding member 4 in the same manner as in Embodiment 1. The first holding projection 49 protrudes along the diffusion plate 5 and contacts the peripheral part of the first surface 51 of the diffusion plate 5. The first holding projection 49 is described in Embodiment 1, and detailed explanation thereon is omitted.

Further, in the television receiver 100 according to Embodiment 3, the second holding projection 65 protrudes locally from the inner surface of the inclined part 611 of the holding frame 6 at an edge of the front end part 64 of the frame 6 in the same manner as in Embodiment 2. The second holding projection 65 protrudes along the diffusion plate 5 and contacts the peripheral part of the second surface 52 of the diffusion plate 5. The second holding projection 65 is described in Embodiment 2, and detailed explanation thereon is omitted.

As shown in FIG. 7, the position of the first holding projection 49 overlaps that of the second holding projection 65 in a plan view towards a main surface (the first surface 51 or the second surface 52) of the diffusion plate 5 along an edge of the diffusion plate. Further, in the television receiver 100 according to Embodiment 3, as mentioned above, both of the first holding projection 49 and the second holding projection 65 are provided, and the peripheral part of the diffusion plate 5 is further sandwiched by the first holding projection 49 and the second holding projection 65.

As mentioned above, there may occur coming off of the diffusion plate 5 due to low-temperature contraction and warping of the diffusion plate 5 due to high-temperature expansion (in a direction shown by an arrow in FIG. 7). However, the first holding projection 49 contacts the peripheral part of the first surface 51 of the diffusion plate 5 to hold the diffusion plate 5, and the second holding projection 65 contacts the peripheral part of the second surface 52 of the diffusion plate 5 to hold the diffusion plate 5. Therefore, coming off or warping of the diffusion plate 5 in a direction shown by an arrow in FIG. 7 is suppressed. Accordingly, occurrence of coming off or warping of the diffusion plate 5 can be prevented beforehand.

The first holding projection 49 may be extended from a center part of the edge of the second end portion 48 in a longitudinal direction of the holding member 4, and the second holding projection 65 may be extended from a center part of the edge of the front end part 64 of the holding frame 6 in a longitudinal direction of the holding frame 6. The positions of the first holding projection 49 and the second holding projection 65 are not limited thereto, and may be changed as required.

In the television receiver 100 according to Embodiment 3, as mentioned above, the peripheral part of the diffusion plate 5 is configured to be sandwiched by the first holding projection 49 and the second holding projection 65, prevention of coming off of the diffusion plate 5 can be achieved. Details will be described below.

When operating or shutting down the television receiver 100, the diffusion plate 5 is expanded or contracted due to heat generation while a light source being turned on or due to a drop of temperature after shutting off the light source. When such expansion and contraction are repeated and sandwiching by the second end portion 48 of the holding member 4 and the front end part 64 of the holding frame 6 is loosened, or when an area of the peripheral part of the diffusion plate 5 which is sandwiched by the second end portion 48 and the front end part 64 is decreased in order to narrower the frame of the television receiver 100, there may arise a problem that such sandwiching is released, thereby causing coming off of the diffusion plate 5 or positional deviation.

In the television receiver 100 according to Embodiment 3, since the diffusion plate 5 is further sandwiched by the first holding projection 49 and the second holding projection 65, even if the above-mentioned problem occurs, coming of the diffusion plate 5 and positional deviation of the diffusion plate 5 can be prevented beforehand and making the frame of the television receiver 100 narrower can be achieved.

In the above-mentioned embodiment, there is exemplified the case of providing one first holding projection 49 at an edge of the second end portion 48 of the holding member 4 and one second holding projection 65 at an edge of the front end part 64 of the holding frame 6. However, this embodiment of the present invention is not limited thereto, and two or more of the first holding projections 49 and further the second holding projections 65 may be provided, respectively.

For the same parts as in Embodiment 1, the same reference numbers are applied and detailed explanation thereon is omitted.

Embodiment 4

The television receiver 100 according to Embodiment 4 has a similar constitution to that of the television receiver 100 according to Embodiment 3, but the both are different from each other in the constitution of the holding member 4 and the holding frame 6.

Figure 8:
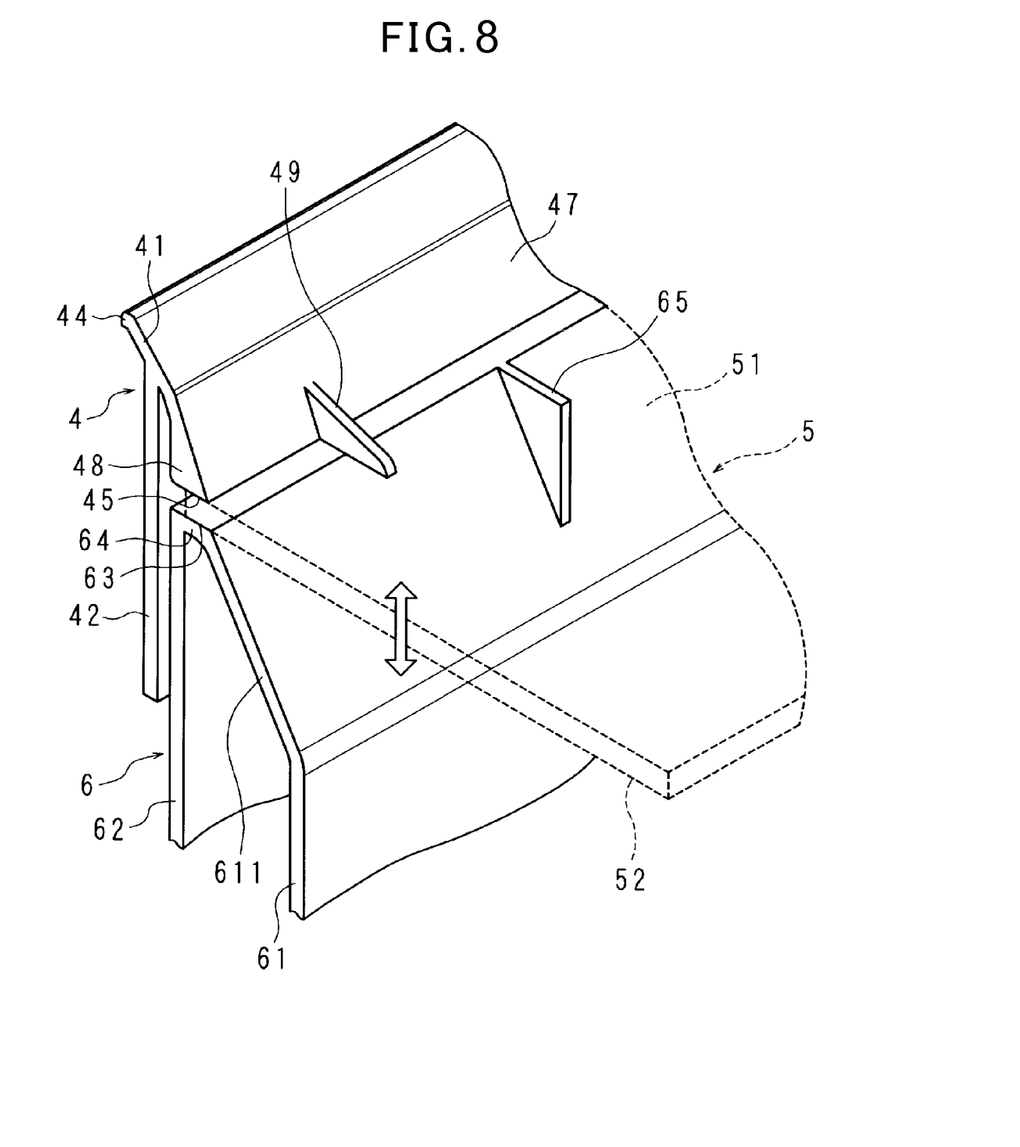
FIG. 8 shows an explanatory view showing a positional relationship of a holding member, a diffusion plate and a holding frame in a television receiver according to Embodiment 4.

FIG. 8 shows an explanatory view showing a positional relationship of the holding member 4, the diffusion plate 5 and the holding frame 6 in the television receiver 100 according to Embodiment 4. In FIG. 8, for the purpose of illustration, the diffusion plate 5 is shown by a dotted line.

In the television receiver 100 according to Embodiment 4, the first holding projection 49 protrudes locally from the inclined surface 47 at an edge of the second end portion 48 of the holding member 4 and contacts the peripheral part of the first surface 51 of the diffusion plate 5 in the same manner as in Embodiment 3. Further, the second holding projection 65 protrudes locally from the inner surface of the inclined part 611 of the holding frame 6 at an edge of the front end part 64 of the frame 6 and contacts the peripheral part of the second surface 52 of the diffusion plate 5. The first holding projection 49 and the second holding projection 65 are already described, and detailed explanation thereon is omitted.

The position of the first holding projection 49 is shifted from that of the second holding projection 65 in a plan view towards a main surface (the first surface 51 or the second surface 52) of the diffusion plate 5 along an edge of the diffusion plate as shown in FIG. 8. Further, in the television receiver 100 according to Embodiment 4, as mentioned above, both of the first holding projection 49 and the second holding projection 65 are provided, and the peripheral part of the diffusion plate 5 is further sandwiched by the first holding projection 49 and the second holding projection 65.

Therefore, in the television receiver 100 according to Embodiment 4, coming off of the diffusion plate 5 due to low-temperature contraction and warping of the diffusion plate 5 due to high-temperature expansion (in a direction shown by an arrow in FIG. 8) can be prevented beforehand.

Namely, in the television receiver 100 according to Embodiment 4, as mentioned above, there may occur coming off of the diffusion plate 5 due to low-temperature contraction and warping thereof due to high-temperature expansion (in a direction shown by an arrow in FIG. 8). However, in the television receiver 100 according to Embodiment 4, the first holding projection 49 contacts the peripheral part of the first surface 51 of the diffusion plate 5 to hold the diffusion plate 5, and the second holding projection 65 contacts the peripheral part of the second surface 52 of the diffusion plate 5 to hold the diffusion plate 5. Therefore, warping of the diffusion plate 5 in a direction shown by an arrow in FIG. 8 is suppressed. Therefore, occurrence of such coming off or warping of the diffusion plate 5 can be prevented beforehand.

The first holding projection 49 may be extended from a center part of the edge of the second end portion 48 in a longitudinal direction of the holding member 4, and the second holding projection 65 may be extended from a center part of the edge of the front end part 64 of the holding frame 6 in a longitudinal direction of the holding frame 6. The positions of the first holding projection 49 and the second holding projection 65 are not limited thereto, and may be changed as required.

In the television receiver 100 according to Embodiment 4, as mentioned above, in addition to the sandwiching by the second end portion 48 of the holding member 4 and the front end part 64 of the holding frame 6, the peripheral part of the diffusion plate 5 is further sandwiched by the first holding projection 49 and the second holding projection 65. Therefore, as mentioned above, even in the case where loosening of the sandwiching by the holding member 4 and the holding frame 6 occurs or the case where an area of the peripheral part of the diffusion plate 5 which is sandwiched by the holding member 4 (second end portion 48) and the holding frame 6 (front end part 64) is decreased, coming off of the diffusion plate 5 and positional deviation thereof can be prevented beforehand and making a picture frame of the television receiver 100 narrower can be achieved.

In the above-mentioned embodiment, there is exemplified the case of providing one first holding projection 49 at an edge of the second end portion 48 of the holding member 4 and one second holding projection 65 at an edge of the front end part 64 of the holding frame 6. However, this embodiment of the present invention is not limited thereto, and two or more of the first holding projections 49 and further the second holding projections 65 may be provided, respectively.

For the same parts as in Embodiment 1, the same reference numbers are applied and detailed explanation thereon is omitted.

What is claimed is:
1. A display apparatus comprising:
   a diffusion plate having a first surface and a second surface opposite to the first surface;
   an optical sheet facing the first surface of the diffusion plate and disposed apart from the first surface of the diffusion plate; and
   a holding member for holding the optical sheet and the diffusion plate, wherein the holding member is disposed between a peripheral part of the optical sheet and a peripheral part of the first surface of the diffusion plate,
   wherein the holding member comprises
   a first end portion having a first end surface contacting a peripheral part of a rear surface of the optical sheet, the rear surface of the optical sheet facing the first surface of the diffusion plate,
   a second end portion having a second end surface contacting the peripheral part of the first surface of the diffusion plate,
   an inner surface extending from the first end surface to the second end surface between the rear surface of the optical sheet and the first surface of the diffusion plate, wherein the inner surface of the holding member faces inwardly and
   a first holding projection extending inwardly from an edge portion where the second end surface and the inner surface intersect, the first holding projection locally protruding from a part of the edge portion and contacting the first surface of the diffusion plate at an inwardly direction from the second end surface of the second end portion.
2. The display apparatus of claim 1, wherein
   the first holding projection is opaque, and the first holding projection has a plate shape extending vertical to the first surface of the diffusion plate.

3. The display apparatus of claim 1, further comprising a holding frame for holding the diffusion plate,
wherein the holding frame has
an end part having a flat surface contacting the second surface of the diffusion plate at the peripheral part of the diffusion plate,
an inner surface extending away from the flat surface, wherein the inner surface of the holding frame faces inwardly, and
extending inwardly from an edge portion where the flat surface and the inner surface of the holding frame intersect,
the second holding projection locally protruding from a part of the edge portion where the flat surface and the inner surface of the holding frame intersect and contacting the second surface of the diffusion plate at an inwardly direction from the flat surface of the end part of the holding frame.

4. The display apparatus of claim 3, wherein a position of the first holding projection overlaps that of the second holding projection in a plan view towards the first surface or the second surface of the diffusion plate.

5. The display apparatus of claim 4, wherein
the diffusion plate is formed in a rectangular shape, and
the first holding projection and the second holding projection are formed in a fin shape, each of these projections having a thickness in a direction extending along an edge of the diffusion plate.

6. The display apparatus of claim 3, wherein a position of the first holding projection is shifted from that of the second holding projection in a plan view towards the first surface or the second surface of the diffusion plate along an edge of the diffusion plate.

7. The display apparatus of claim 6, wherein
the diffusion plate is formed in a rectangular shape, and
the first holding projection and the second holding projection are formed in a fin shape, each of these projections having a thickness in a direction extending along an edge of the diffusion plate.

8. The display apparatus of claim 3, wherein
the diffusion plate is formed in a rectangular shape, and
the first holding projection and the second holding projection are formed in a fin shape, each of these projections having a thickness in a direction extending along an edge of the diffusion plate.

9. The display apparatus of claim 3, wherein
the second holding projection is opaque, and
the second holding projection has a plate shape extending vertical to the second surface of the diffusion plate.

10. A display apparatus comprising:
a diffusion plate having a first surface and a second surface opposite to the first surface;
an optical sheet facing the first surface of the diffusion plate and disposed apart from the first surface of the diffusion plate;
a holding member for holding the optical sheet and the diffusion plate, wherein the holding member is disposed between a peripheral part of the optical sheet and a peripheral part of the first surface of the diffusion plate; and
a holding frame for holding the diffusion plate,
wherein the holding frame has
an end part having a flat surface contacting the second surface of the diffusion plate at a peripheral part of the diffusion plate,
an inner surface extending away from the flat surface, wherein the inner surface of the holding frame faces inwardly, and
extending inwardly from an edge portion where the flat surface and the inner surface of the holding frame intersect, the second holding projection locally protruding from a part of the edge portion where the flat surface and the inner surface of the holding frame intersect and contacting the second surface of the diffusion plate at an inwardly direction from the flat surface of the end part of the holding frame.

11. The display apparatus of claim 10, wherein
the diffusion plate is formed in a rectangular shape, and
the second holding projection is formed in a fin shape, the second holding projection having a thickness in a direction extending along an edge of the diffusion plate.

12. The display apparatus of claim 10, wherein
the second holding projection is opaque, and
the second holding projection has a plate shape extending vertical to the second surface of the diffusion plate.

* * * * *